United States Patent [19]

Lucas

[11] Patent Number: 5,481,139
[45] Date of Patent: Jan. 2, 1996

[54] SAFETY CIRCUIT BREAKER FOR VEHICLES

[76] Inventor: Daniel Lucas, 202 Pine Tree Dr., Robersonville, N.C. 27871

[21] Appl. No.: 122,938

[22] Filed: Sep. 20, 1993

[51] Int. Cl.$^6$ ..................................................... B60L 3/00
[52] U.S. Cl. ................. 307/9.1; 307/10.1; 200/61.45 R; 200/61.5
[58] Field of Search ...................... 361/115; 200/61.45 R, 200/61.52, 61.53, 61.45 M, 61.5; 307/116, 119, 120, 121, 132 EA, 132 V, 132 M, 9.1–10.8; 180/174, 271

[56] References Cited

U.S. PATENT DOCUMENTS

| | | | |
|---|---|---|---|
| 3,743,849 | 7/1973 | Iwata | 307/10.1 |
| 4,178,492 | 12/1979 | Roesch et al. | 200/61.45 R |
| 4,912,338 | 3/1990 | Bingham | 307/9.1 |
| 5,034,620 | 7/1991 | Cameron | 307/10.1 |

Primary Examiner—Jonathan Wysocki
Assistant Examiner—Peter Ganjoo
Attorney, Agent, or Firm—Richard C. Litman

[57] ABSTRACT

This invention is an emergency, inertia-type circuit breaker that is opened when a vehicle is involved in an accident. Within a fraction of a second after the initial accident impact, current will flow to the unlocked side of electric powered door locks and to auxiliary emergency equipment such as side or rear seat airbags and the like. Once the circuit breaker is completely opened, all electrical systems of the vehicle will be shut down except current to the auxiliary emergency equipment and to the open side of electric powered windows.

16 Claims, 5 Drawing Sheets

SAFETY CIRCUIT BREAKER FOR VEHICLES

FIELD OF INVENTION

The invention relates to vehicles and more particularly to safety circuit breakers for the same.

BACKGROUND OF INVENTION

Since the development of motorized vehicles, there has been a genuine concern that in the case of an accident, sparks from the electrical system and its associated equipment will ignite spilled fuel or other flammable material. Fire following an accident is particularly dreaded since it can overcome the occupants of the vehicle and can hamper or even prevent rescue. This is true not only for land vehicles but also for boats, airplanes, and the like.

In an effort to reduce the risk of fire ignited by electrical system malfunctions as a result of an accident, various devices have been developed to cut off or disconnect one of the terminals of the battery to cut off electrical current to the electrical system of the vehicle. In each of these instances, however, the engine of the vehicle can continue to produce electricity and run on the current from the alternator until either the voltage regulator or the alternator diode is destroyed by excessive electrical current which can take several minutes. In addition to the above, when the battery circuit is interrupted by one of the prior art devices, the entire vehicle electrical system is shaft down which includes immobilizing electrical door locks and electrical windows thus further impeding rescue from the outside and making it more difficult for the occupants of the vehicle to escape therefrom. Also, all emergency flashing equipment is immobilized which can hamper locating an accident or even prevent potential rescuers from realizing an accident has occurred either off the road in the case of a land vehicle or a remote area in the case of an aircraft or boat.

DESCRIPTION OF PRIOR ART

Concise Explanation of References

U.S. Pat. No. 3,798,399 to Corporandy discloses an anti-incendiary device for preventing fires upon collision of an automotive-type vehicle having An internal combustion engine, such device comprising a ball held between two vertical coaxial plastic pistons with springs urged toward the ball. When the ball is dislodged, the circuit between the battery and the ignition system of the engine is opened. In reality, the brass bridge and studs of this Patent will lack reliability and risk electrical interruptions due to oxidation between the bridge and the contacts. Also, this is simply a disconnecting means for the ignition circuit and does not include any of the other safety features of the present invention.

U.S. Pat. No. 5,038,006 to Lowe, Sr. et al discloses an electrical switch in the form of a pendulum that breaks contact with the power terminals of the battery upon a severe jolt such as a collision. Also, there is a provision for a flasher and emergency circuit to be activated. This presumes, however, that the battery of the vehicle has not been destroyed. Also, in a collision at least one of the sets of emergency lights of the vehicle would normally be destroyed and thus rendered inoperative. Further, current going to the normal emergency flashers of the vehicle, when the lights have been damaged, could cause shorts and arcing which can readily spark a fire.

U.S. Pat. No. 5,123,498 to Alcidi et al simply discloses an apparatus for the automatic release of motor vehicle safety belts after a collision. Other than being activated by a collision, this Patent is not otherwise considered pertinent to the present invention.

U.S. Pat. No 4,859,818 to Landais is an electric inertia-actuated circuit breaker but does not include any of the other many features of the present invention.

U.S. Pat. No. 4,903,720 to McGill again is a shock activated shut-off device but is not otherwise considered relevant to the present invention.

U.S. Pat. No. 3,473,849 to Iwata is considered of interest in that it discloses a power disconnect circuit for vehicles due to impact which also automatically cuts off the fuel circuit of the vehicle. This, of course, is not necessarily instantaneous if the engine is carbureted, or in the case of a fuel injected engine, if the injector circuit is not cut off. The reason for this is that fuel remaining in the fuel line can be burned to continue the operation of the engine, or in case of rupture of such line, can be spilled.

U.S. Pat. Nos. 3,743,803 and 3,916,127 to Roesch et al both disclose inertia circuit breakers but do not otherwise disclose features of the present invention.

Finally, U.S. Pat. No. 3,889,774 to Schwenk is for an accident responsive ignition cut-off switch that is gravity activated when the vehicle is canted at as milch as 50° from normal upright position while U.S. Pat. Nos. 5,034,620 and 5,120,617 to Cameron show a battery switch that is responsive to perturbation of the vehicle by an accident to cause a fuse link to blow.

BRIEF DESCRIPTION OF THE INVENTION

After much research and study into the above-mentioned problems, the present invention has been developed to provide an inertia-type circuit breaker in combination with multiple safety features. This circuit breaker or switch neutralizes a pole of the battery while simultaneously neutralizing the alternator to prevent the same from feeding electrical current to the vehicle circuit. Within 1/100th of a second after impact, the means of the present invention releases the vehicle door locks, activates auxiliary emergency equipment, and stops the flow of fuel. At the same time, independent flash units are activated on the interior front and rear of the passenger compartment to draw attention to the fact that there has been an accident and where it is located. There is no danger of fire ignition from this source since a low voltage source of power is provided.

The fact that the above features are triggered within 1/100th of a second assures that the same can be accomplished prior to possible destruction of the battery due to the impact of the accident.

The present invention is not only fast functioning upon activation to accomplish the results set forth, but is also reliable, which is of utmost importance in equipment of this type.

OBJECTS OF THE INVENTION

In view of the above, it is an object of the present invention to provide a safety circuit breaker for vehicles that disrupts power to the starter, fuel injector and alternator of the vehicle as well as to the fuse box for auxiliary equipment.

Another object of the present invention is to provide a vehicle circuit breaker, that upon collision, shuts down all functioning systems while at the same time unlocking power doors, lowering power windows, activating auxiliary emergency equipment and activating a separate independently powered flasher system.

Another object of the present invention is to provide a collision safety system which activates a separate emergency flasher system that is independently powered and cannot ignite a fire even in case of damage or malfunction.

Another object of the present invention is to provide a means for shutting down a vehicle's electrical system including starter, fuel injectors and alternators while at the same time unlocking doors, activating emergency equipment, including a separately powered flasher system, within 1/100th of a second after a collision or other perturbation of the vehicle by an accident.

Another object of the present invention is to provide a safety circuit breaker that is reliable during normal use even when operating a vehicle on rough terrain.

Another object of the present invention is to provide a safety circuit breaker for vehicles wherein an inertia ball, once ejected by a shock, is uniquely trapped so the electrical contact cannot be unintentionally reestablished.

Another object of the present invention is to provide a safety circuit breaker for vehicles that acts as a safety device to cut off electrical supply while at the same time activating multiple safety functions.

Other objects and advantages of the present invention will become apparent and obvious from a study of the following description and the accompanying drawings which are merely illustrative of such invention.

DETAILED DESCRIPTION OF INVENTION

Figure 1:
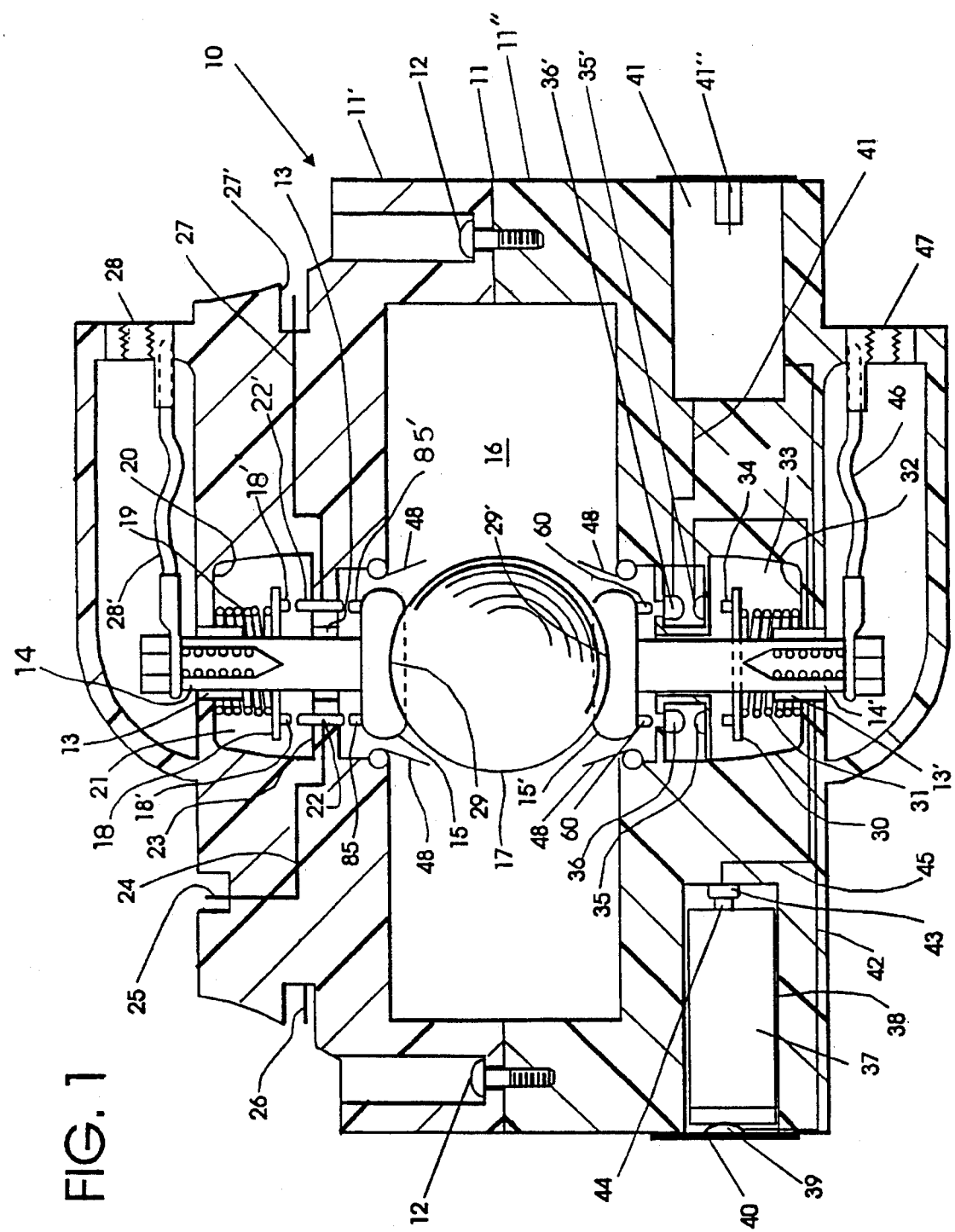
FIG. 1 is a sectional view showing the circuit breaker portion of the present invention in closed position.

With further reference to the drawings, the circuit breaker portion of the present invention, indicated generally at 10 includes a housing 11 formed from a hard rubber or plastic material. Since materials of this type are well known to those skilled in the art further, detailed discussion of the same is not deemed necessary.

The housing 11 is formed from an upper portion 11' and a lower portion 11". These two portions or halves are held together by suitable means such as screws 12. Since screw-type fasteners are well known to those skilled in the art, further detailed discussion of the same is not deemed necessary.

Axially aligned openings are provided in the upper and lower portions 11' and 11" of housing 11. These openings are lined with upper bushings 13 and lower bushings 13'. An upper ball support member 14 is slidably mounted in upper bushings 13 and a lower ball support member 14' is mounted in lower bushings 13'.

The interior ends of support members 14 and 14' terminate in mushroom-shaped ball retaining portions 15 and 15'. The surfaces 29 and 29' spacing the interior 16 of housing 11 are concave so that they can retainingly engage the metal inertia ball 17.

A generally circular contact plate 13 is secured to the shaft-like upper ball support member 14. This plate includes two downwardly projecting contacts 18'.

A relatively heavy coil-type spring 19 is provided between contact plate 18 and the inner surface 20 of upper contact chamber 21 to bias the upper support member 14 toward inertia ball 17 as can clearly be seen in FIG. 1.

A pair of contacts 22 and 22' are provided in the lower interior surface 23 of upper contact chamber 21. These contacts are in axial alignment with contacts 18' of contact plate 18. A pair of contacts 85 are provided on the upper surfaces of the mushroom portion 15. These contacts are also in axial alignment with contacts 22 and 22'.

Contact 22 is electrically connected to wire 24 which splits and terminates at electrical socket recesses 25 and 26.

Contacts 22' is electrically connected to wire 27 which terminates at electrical socket recess 27'.

A heavy duty braided upper connector wire 28' is connected between the outer end of upper ball support member 14 and interiorly threaded electrical terminal 28.

The shaft-like portion of lower ball support member 14' is slidably mounted in lower bushings 13'. The mushroom-shaped end 15' of lower ball support member 14' includes a concave surface 29' that is in electrical contact with inertia ball 17.

A lower plate 30 is fixed to the shaft portion of lower ball support member 14'. A relatively heavy coil spring 31 is disposed between the plate 30 and the lower interior surface 32 of lower contact chamber 33 to bias the lower ball support member 14' and its associated mushroom-shaped held 15' toward inertia ball 17 to hold the same in place as shown in FIG. 1.

Non-conducting engaging pins 34 formed from plastic or other suitable material are mounted on the upper surface of lower plate 30 in alignment with leaf electrical contacts 35 and 35'. Plastic engaging pins 60 are provided on the lower surface of mushroomshaped end 15' of lower ball support member 14'. These pins are non-conducting and are in alignment with leaf electrical contacts 36 and 36'.

An auxiliary electrical source such as a long lasting 1.5 volt battery 37 is operatively mounted within battery compartment 38. A contact 39 is mounted on the inside of battery compartment closure 40. Contact 39 is electrically contacted to electronic flash circuit 41 by a wire 42. Positive contact 43 connects the positive terminal 44 of battery 37 to wire 45 which in turn connects said contact 43 to electronic flasher 41.

A heavy duty braided lower connector wire 46 is connected at one end to lower ball support member 14' and at the other end to interiorly threaded electrical terminal 47.

Figure 2:
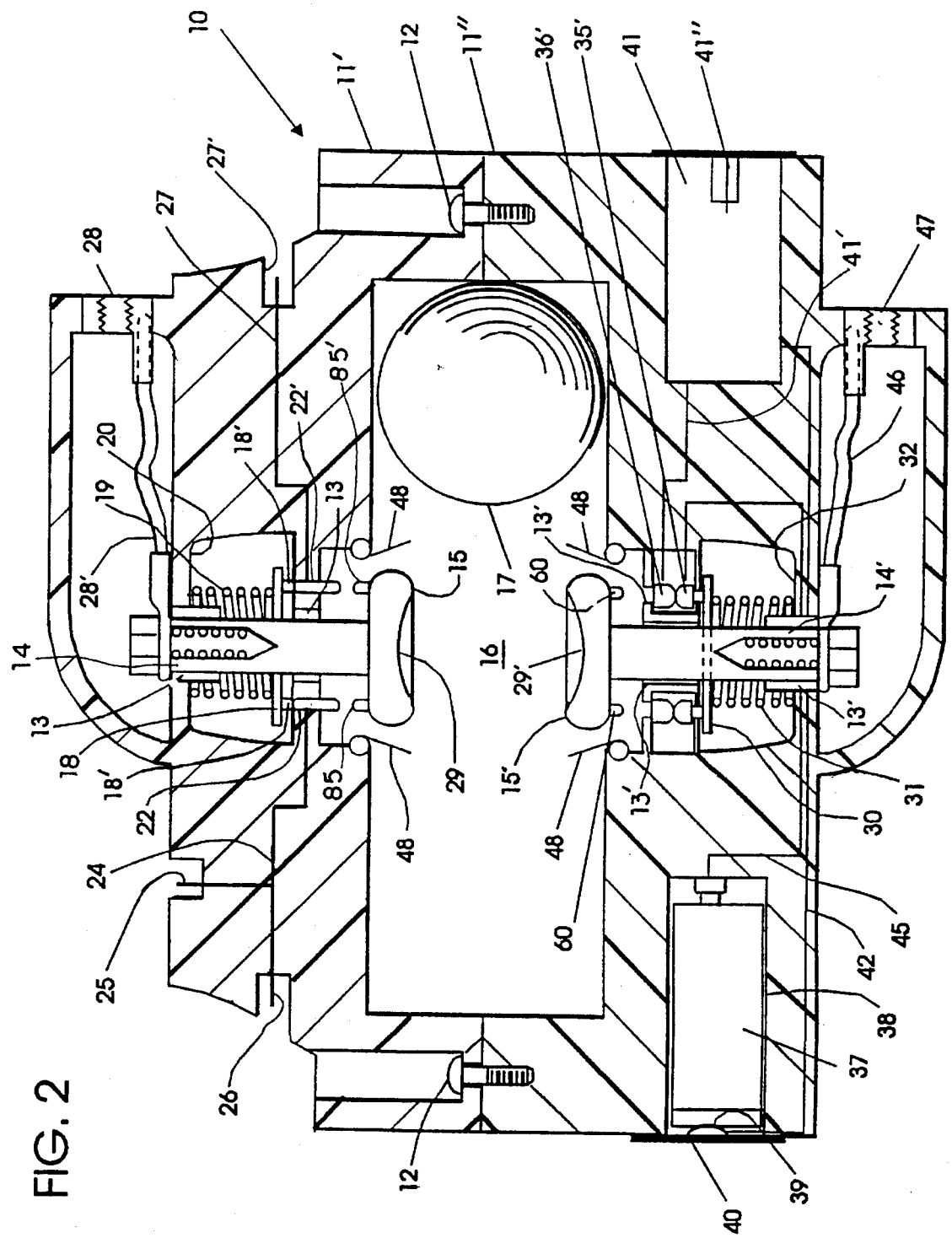
FIG. 2 shows the circuit breaker portion of the present invention after the circuit has been opened.

A plurality of springs 48 are mounted about inertia ball 17 and are angled slightly away from said ball as can clearly be seen in FIGS. 1 and 2. When the inertia ball is knocked from the concave surfaces 29 and 29' of mushroom-shaped ends 15 and 15', as will hereinafter be described in greater detail, such ball will deflect said springs but will be prevented from moving back into contact with said mushroom portions by said springs as clearly illustrated in FIG. 2.

A plurality of electrical contacts 85 and 85' are mounted on the side of mushroom-shaped end 15 opposite concave surface 29. These contacts are in alignment with contacts 22 and 22'.

Figure 3:
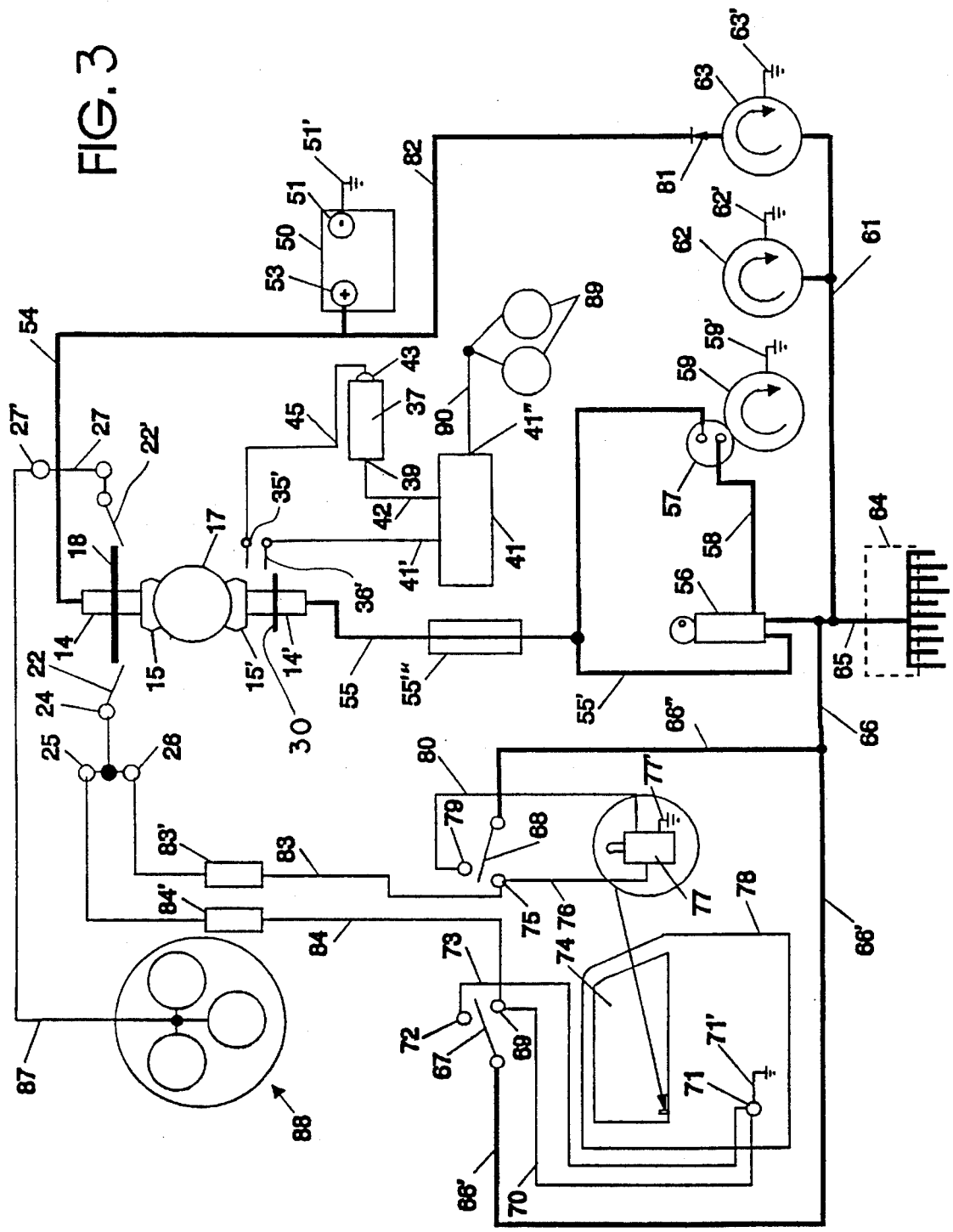
FIG. 3 is a schematic showing the circuit breaker of the present invention in the closed position.
Figure 4:
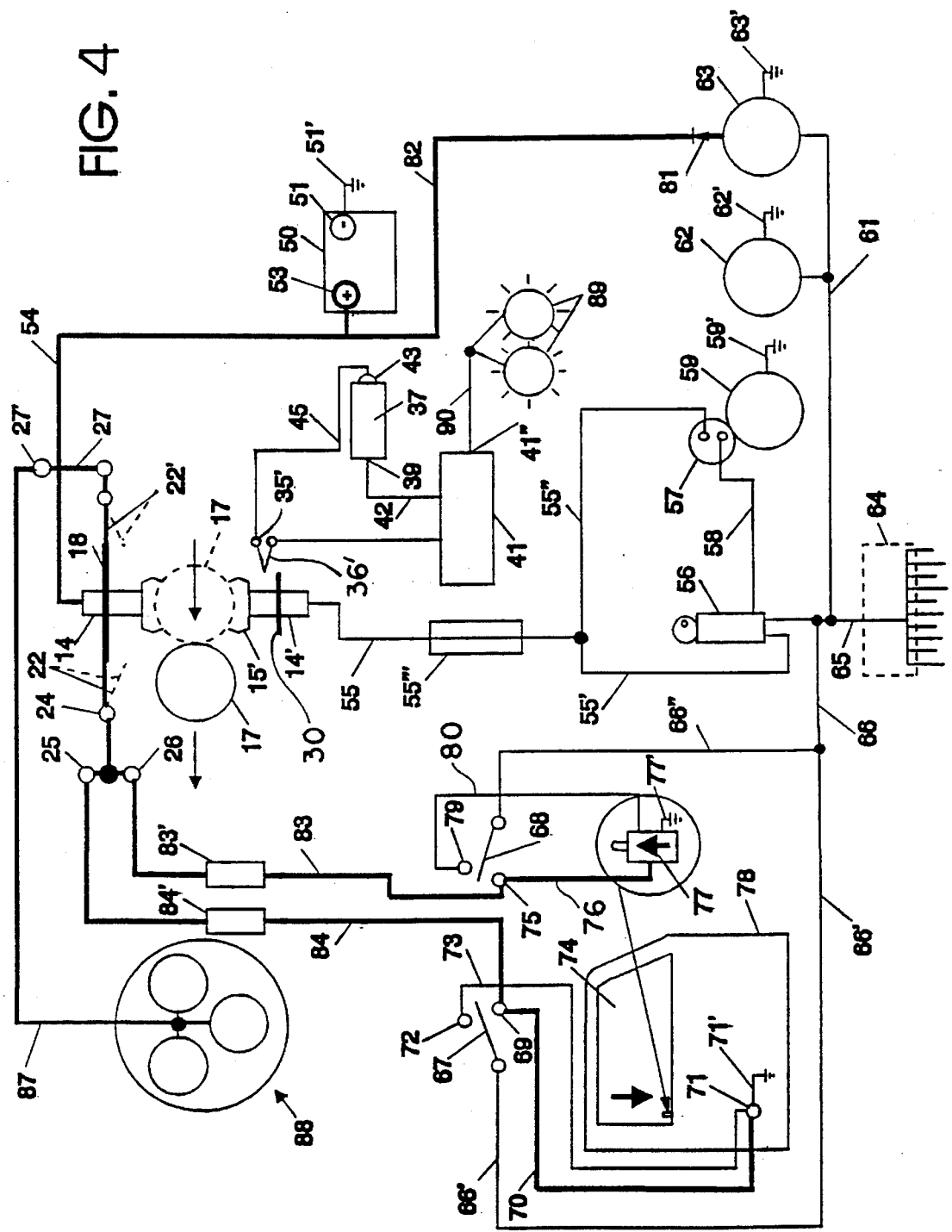
FIG. 4 is a schematic of the present invention after the circuit breaker has been opened.
Figure 5:
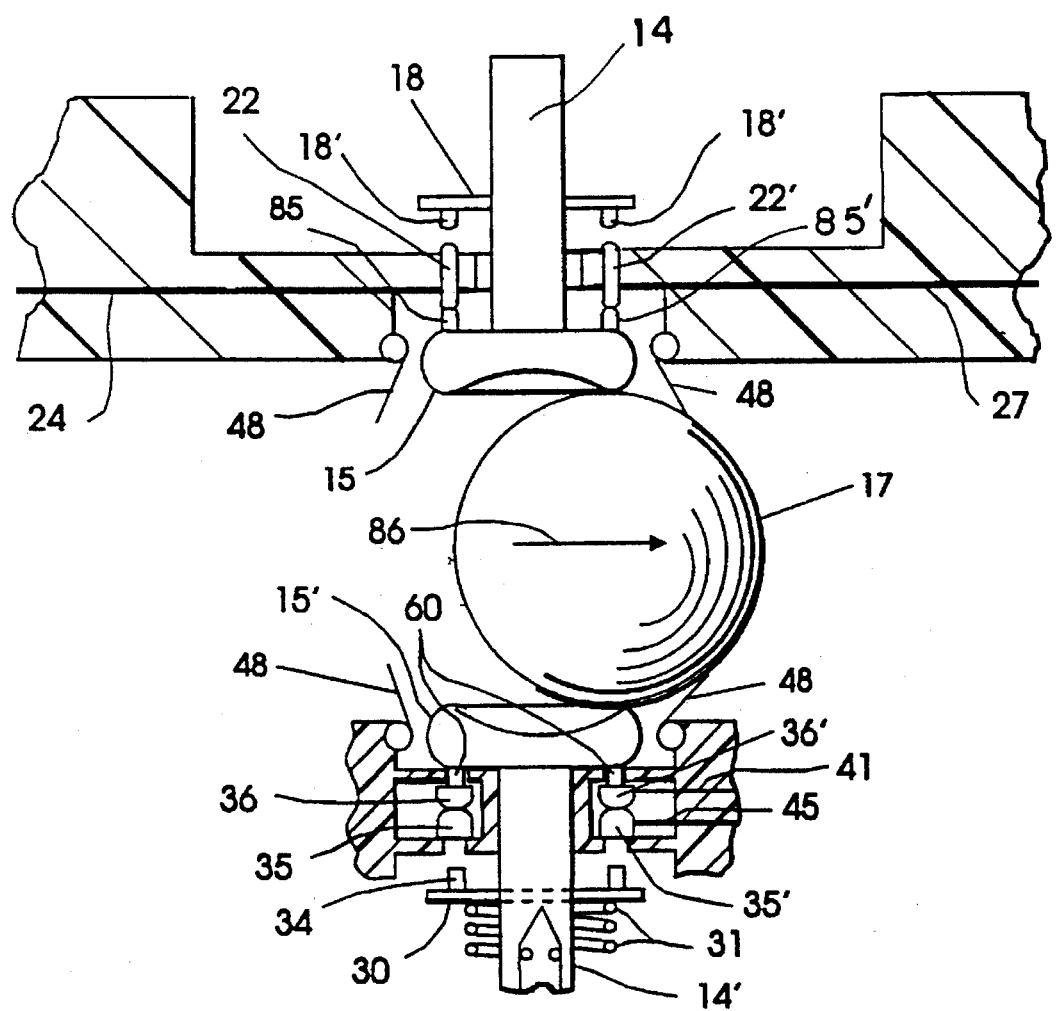
FIG. 5 shows the ball support portion of the present invention upon initial movement of the ball.

Referring more specifically to the schematics of FIGS. 3, 4 and 5, the vehicle battery 50 includes a negative terminal 51 that is grounded as indicated at 51'. The positive terminal 53 of such battery is connected to one end of battery cable 54 with the other end being connected to terminal 28. Through connector wire 28 electrical contact is made with upper ball support member 14. This member, through mushroom-shaped end 15, is in electrical contact with inertia ball 17. Mushroom-shaped end 15' is also in electrical contact with said ball, and through lower ball support member 14', lower connector wire 46, and electrical terminal 47, is connected to wire 55. This wire splits with wire 55' going to the positive terminal of ignition switch 56 while wire 55" is connected to starter solenoid 57. Also a main circuit fuse is provided in wire 55 as indicated at 55'".

The above described circuit from battery 50 to ignition switch 56 and starter solenoid 57 are the only portions of the circuit that are electrified when said ignition switch 56 is in "off" or open position except for wire 82 that is connected to diode 81 of alternator 63.

The ignition switch 56 is connected to solenoid 57 by wire 58. The solenoid 57 is operatively connected to starter 59 which is grounded as indicated at 59'.

Wire 61 electrically connects the fuel injectors 62 and the alternator 63 to ignition 56. The fuel injectors and alternator are grounded as indicated at 62' and 63', respectively.

The standard vehicle fuse panel 54 is electrically connected to ignition switch 56 by wire 65.

Wire 66 is connected to wire 65 and splits into wire 66' which is electrically connected to the normal electric window switch 67. Wire 66" electrically connects the normal electric door lock 68 to ignition switch 56.

When electric window control switch 67 is manipulated to close the circuit through contact 69, electrical current can flow through wire 70 to electric window motor 71 to lower window 74. Ground 71' is provided for said electric window motor.

When electric window switch 67 is manipulated to close contact 72, current can flow through wire 73 to raise the window 74 by activating motor 71 in the opposite direction from that described above.

When the electric door lock switch 68 is closed with contact 75, electrical current will flow through wire 76 to cause door lock solenoid 77 to unlock its associated door 78. When electric door lock switch 68 is manipulated to close the same through contact 79, electric current will flow through wire 80 to cause solenoid 77 to lock its associated door 78. Door lock solenoid 77 is grounded in the normal manner as indicated at 77'.

When the ignition switch 56 of the present invention is in the "on" or closed position, electrical current will flow through the circuit shown in bold lines on FIG. 4.

Contact 22 through wire 24 is electrically connected to recess plugs 25 and 26. Wire 83 connects plug 26 with wire 76 that activates solenoid 77 to unlock door 78.

Wire 84 connects socket 25 to wire 70 that is used to activate electric window motor 71 to lower window 74.

A fuse 83' is provided in wire 83 of the unlocking circuit while a second fuse 84' is provided and wire 84 to the window lowering circuit. Contact 22' is connected by wire 27 to electrical socket 27'. This socket is connected through wire 87 to auxiliary emergency equipment indicated generally at 88. This equipment can take the form of electrically activated airbags, time delayed seat belt releases, and the like.

When electrical contacts 35' and 36' are closed, current will flow from positive contact 43 of battery 37, through wire and 41', to flasher 41. The circuit is completed through wire 42 that goes to ground 39 of said battery 37. The light emitting flasher units 39 ace activated through wire 90 to allow the vehicle to be more readily spotted by potential rescuers in case of an accident.

The heavy schematic lines on FIG. 5 show the flow of electrical current when the metal inertia ball contact 17 becomes disengaged from the mushroom-shaped ends 15 and 15' of ball support members 14 and 14'.

When the metal inertia ball 17 is in place between the mushroom shaped ends 15 and 15' of ball support members 14 and 14' within circuit breaker 10, the electrical circuits shown in bold lines in FIGS. 3 and 4 will be energized, depending on whether ignition switch 56 is "on" or "off".

Should the vehicle in which the present invention is installed be involved in an accident with enough force to dislodge, because of inertia, ball 17 from is seat between mushroom portions 15 and 15', such initial movement will cause said mushroom shaped retainers to move away from each other as shown in FIG. 6. As this happens, mushroom portion 15 is forced upwardly against the bias of spring 19. This causes the contacts 85 and 85' to close with contacts 22 and 22'. Once this happens current will flow from contact 22, through wire 83, to cause solenoid 77 to unlock doors 78 also contact 22' will send current through wire 87 to emergency equipment 88.

At the same time mushroom portion 15' will be pushed downwardly against the bias of the spring 31. The engaging pins 60 on the bottom of mushroom portion 15' will cause leaf contact 36' to close with leaf contact 35' sending current through wire 45 to activate flasher 41 and its associated flasher lights 89.

On collision impact, the time it takes the ball contact 17 to move from the position shown' in FIG. 1 to the position shown in FIG. 6 to close the contacts described above, will on the average be 1/100th of a second. As the inertia contact ball 17 continues to move in the direction of arrow 86 in FIG. 6, it will move out of contact with mushroom portions 15 and 15' and deflect adjacent retaining springs 48 to pass therebetween to reach the position in the interior 16 of circuit breaker housing 11 shown in FIG. 2. Once in this position the restraining springs 48 will prevent said contact ball 17 from reengaging mushroom portions 15 and 15'.

As soon as contact ball 17 becomes disengaged from said mushroom portions, the bias of spring 19 against contact plate 18, will force ball support member 14 downwardly causing contacts 18'to come into constant contact' with contacts 22 and 22'. Current will now continually flow through wire 84 to cause windows 74 to open. Also wire 87 will carry continuous current to emergency equipment 88.

The bias of spring 31 will move lower plate 30 and its associated ball support 14' upwardly so that engaging pins 34 on such plate will engage leaf contacts 35 and 35' closing the same with leaf contacts 36 and 36'. This again will cause current to flow from auxiliary battery 37 to flasher unit 41 which controls flash emitting lights 89. Since these lights are of the low voltage, high intensity type, they will flash for many hours or even days if necessary. These flashers are mounted in the forward and rear portion of the passenger compartment of the vehicle so they can be easily seen through the windows of such vehicle, even at great distances. Also these flashers are timed to flash once every two seconds, or as deemed appropriate. They could be flashed simultaneously or alternately.

In summary, as the inertia contact ball 17 moves from its concave seat in mushroom portions 15 and 15', current will flow to the electric lock system to unlock the door of the vehicle. Instantaneous current will also flow through the flasher system to activate the same as well as to the emergency equipment 88. This instantaneous current flow will occur prior to the possible destruction of the battery 50 due to crash impact.

As soon as the inertia ball 17 becomes completely disengaged from the mushroom portions 15 and 15', current can flow from battery 50, if the same has not been destroyed, through wire 84 to open the windows 74 of the vehicle. Regardless of whether the battery 50 has been destroyed, the emergency flasher system powered by its own auxiliary battery will begin to function and continue to function over an extended period of time.

Also, as soon as the inertia ball contact 17 becomes completely disengaged from the mushroom portion 15 and 15', all power is shut off to the ignition, the starter and its associated solenoid, the fuel injectors, the starter, and the fuse box for all auxiliary equipment.

From the above it can be seen that the present invention provides an inertia-type circuit breaker in combination with multiple safety features including unlocking of the doors of the vehicle and activating emergency equipment within 1/100th of a second after impact and before the vehicle battery can be destroyed. At the same time an independent flasher system is activated within the passenger compartment to draw attention to the facet that an accident has occurred. Additionally, the windows of the vehicle can be automatically opened and all of the power sources shut off to prevent fire ignition from electrical system sparking. All of these feature provide an extremely reliable and relatively inexpensive safety system.

The terms "upper", "lower" "top" "bottom", "side" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A collision activated safety system for vehicles comprising:

an electrically conductive ball;

a first electrically conductive ball support having a first concave surface, said first ball support biased toward said ball;

a second electrically conductive ball support having a second concave surface, said second ball support biased toward said ball, said ball retained between said concave surfaces of said first and said second ball supports;

a housing containing said ball, said first ball support, and said second ball support, said housing including an electrical contact proximate to said first ball support;

input means for electrically connecting said first ball support to a primary electricity source;

output means for electrically connecting said second ball support to at least one electrical device, said ball providing an electrical connection between said input means and said output means;

an electrically conductive contact plate attached to said first ball support proximate said electrical contact;

first contact means for electrically contacting said electrical contact, said first contact means disposed on said first ball support; and second contact means for electrically contacting said electrical contact, said second contact means disposed upon said contact plate;

whereby upon a sudden shock to the collision activated safety system, said ball initially acts upon said first and said second concave surfaces to force said first ball support and said second ball support apart thus activating said first contact means thereby providing electricity from the primary electricity source to said electrical contact, and whereby subsequent to said ball forcing said first and second ball supports apart, said ball withdraws completely from between said first and second ball supports to allow said ball supports to approach one another, thus breaking electrical contact between said input means and said output means and activating said second contact means, thereby providing electricity from the primary electricity source to said electrical contact.

2. The collision activated safety system according to claim 1, further comprising:

means for preventing said ball from simultaneously contacting said first and said second ball supports after said ball has been withdrawn from between said first and said second ball supports.

3. The collision activated safety system according to claim 1, wherein said primary electricity source support includes a battery.

4. The collision activated safety system according to claim 1, wherein said primary electricity source includes an alternator.

5. The collision activated safety system according to claim 1, wherein the at least one electrical device includes a starter.

6. The collision activated safety system according to claim 1, wherein the at least one electrical device includes an engine fuel injector.

7. The collision activated safety system according to claim 1, wherein the at least one electrical device includes an accessory fuse panel.

8. The collision activated safety system according to claim 1, wherein the at least one electrical device includes an alternator.

9. The collision activated safety system according to claim 1, wherein said electrical contact is electrically connected to an unlocking circuit of a power door.

10. The collision activated safety system according to claim 1, wherein said electrical contact is electrically connected to a lowering circuit of a power window.

11. The collision activated safety system according to claim 1, wherein said electrical contact is electrically connected to auxiliary emergency equipment.

12. The collision activated safety system according to claim 1, wherein said auxiliary emergency equipment includes electrically activated airbags.

13. The collision activated safety system according to claim 1, wherein said auxiliary emergency equipment includes time delayed seat belt releases.

14. The collision activated safety system according to claim 1, wherein said first means for contacting said electrical contact is activated within 1/100th of a second upon collision of the vehicle.

15. The collision activated safety system according to claim 1 further comprising:

a secondary electricity source;

an activatable electrical device;

a set of electrical contacts operably connected to one of said ball supports, said set of electrical contacts including, a first contact electrically connected to said secondary electricity source, and a second contact electrically connected to said activatable electrical device; whereby upon complete withdrawal of said ball from between said first and said second ball supports said first contact contacts said second contact thereby providing electricity from said secondary electricity source to activate said activatable electrical device.

16. The collision activated safety system according to claim 15, wherein said activatable electrical device includes an emergency light emitting flasher.

* * * * *